C. A. LEWIS.
PICKLE FORK.
APPLICATION FILED OCT. 9, 1917.
1,327,438.
Patented Jan. 6, 1920.
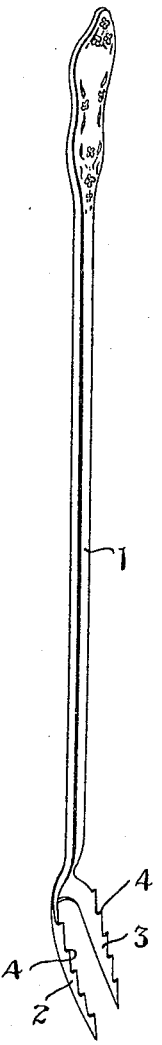
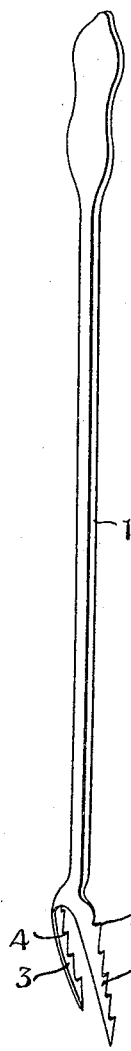
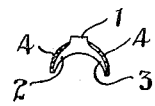
Fig. 3.
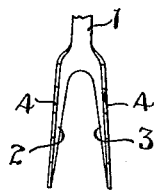
Fig. 4.
Fig. 1.    Fig. 2.
Inventor.
Charles A. Lewis,
by H. J. S. Dennison,
atty.

UNITED STATES PATENT OFFICE.

CHARLES A. LEWIS, OF TORONTO, ONTARIO, CANADA.

PICKLE-FORK.

1,327,438.      Specification of Letters Patent.      Patented Jan. 6, 1920.

Application filed October 9, 1917. Serial No. 195,516.

*To all whom it may concern:*

Be it known that I, CHARLES AUSTEN LEWIS, a subject of the King of Great Britain, and resident of the city of Toronto, county of York, Province of Ontario, in the Dominion of Canada, have invented certain new and useful Improvements in Pickle-Forks, described in the following specification and illustrated in the accompanying drawings, that form part of the same.

The objects of this invention are to provide a form of pickle fork which will enable the user to extract any and all kinds of pickles from any form of a bottle with great ease and will entirely obviate the annoyance due to such operation.

The principal feature of the invention consists in the novel construction of the tines of the fork which are serrated on the upper edges and so shaped as to form a semi-scoop shaped receptacle.

In the drawings, Figure 1 is a perspective view from the front side of a fork constructed in accordance with this invention.

Fig. 2 is a perspective view from the back or under-side of the fork.

Fig. 3 is an end view of the fork.

Fig. 4 is a plan view of the tine end of the fork.

Like numerals of reference indicate corresponding parts in each figure.

Referring to the drawings, 1 is the fork handle which is preferably offset at the fork end in the usual manner and spread outwardly in a shape similar to the base of a spoon having the tines 2 and 3 turned upwardly and outwardly in a sloping direction.

The inner or lower edges of the tines are preferably smooth and the upper edges are serrated to form a plurality of gripping teeth 4 extending the full length from the tip of the tines to the shoulder.

The space between the tines is sufficiently narrow so that the ordinary forms of pickle, such as onions, gherkins, etc., will not fall through and in use the fork is held with the serrated edges upwardly so as to allow the pickle to lie between the sloping sides.

If in removal from the bottle the pickle has any tendency to slip off the serrated edges will engage the sides of the pickle and hold it securely or if desired the fork can be turned sidewise or downwardly and the serrated edges will engage the pickle and act as a rake to effectually remove it from the bottle.

It will also be observed that the fork can be used successfully by impaling the pickle on the points if so desired.

What I claim as my invention is:—

1. A pickle fork having rigid tines formed integral with the handle and spaced apart having their flat sides set in angular relation to each other, the upper edges having serrated teeth arranged at the points sloping upwardly toward the handle.

2. A pickle fork formed with a bifurcated end, the base of the tines being formed in spoon shape at the point of juncture and the tines set in an upwardly sloping position and formed with a plurality of teeth in the upper edge.

C. A. LEWIS.